United States Patent
Maeda et al.

(10) Patent No.: US 9,551,796 B2
(45) Date of Patent: Jan. 24, 2017

(54) RADIATION IMAGE CONVERSION PANEL

(71) Applicant: Konica Minolta, Inc., Tokyo (JP)

(72) Inventors: Keiko Maeda, Hachioji (JP); Tetsuo Shima, Akishima (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/855,799

(22) Filed: Sep. 16, 2015

(65) Prior Publication Data

US 2016/0077220 A1    Mar. 17, 2016

(30) Foreign Application Priority Data

Sep. 17, 2014   (JP) .................. 2014-188949

(51) Int. Cl.
*G21K 4/00* (2006.01)
*G01T 1/20* (2006.01)
*G01T 1/202* (2006.01)

(52) U.S. Cl.
CPC ........... *G01T 1/2012* (2013.01); *G01T 1/2023* (2013.01); *G21K 4/00* (2013.01); *G21K 2004/06* (2013.01); *G21K 2004/12* (2013.01)

(58) Field of Classification Search
CPC ............. G01T 1/20; G01T 1/202; G21K 4/00; G21K 2004/04
See application file for complete search history.

(56) References Cited

U.S. PATENT DOCUMENTS

| | | | |
|---|---|---|---|
| 8,957,383 B2 * | 2/2015 | Sasaki | G01T 1/20 250/361 R |
| 2012/0193543 A1 * | 8/2012 | Kaneko | C23C 14/0694 250/369 |
| 2012/0294425 A1 | 11/2012 | Nagata et al. | |
| 2012/0312999 A1 | 12/2012 | Oike et al. | |
| 2014/0361182 A1 * | 12/2014 | Hasegawa | G21K 4/00 250/367 |

FOREIGN PATENT DOCUMENTS

| | | |
|---|---|---|
| JP | 2001059899 A | 3/2001 |
| JP | 2011027569 A | 2/2011 |
| JP | 2012251974 A | 12/2012 |
| JP | 5286437 B2 | 6/2013 |
| WO | 2011089946 A1 | 7/2011 |

* cited by examiner

*Primary Examiner* — David Porta
*Assistant Examiner* — Faye Boosalis
(74) *Attorney, Agent, or Firm* — Lucas & Mercanti, LLP

(57) ABSTRACT

A radiation image conversion panel having a high luminance and sharpness is provided by growing columnar crystals from the root portion. The radiation image conversion panel includes a support; and a phosphor layer mainly composed of an alkali halide, the phosphor layer being formed by vapor deposition; wherein the phosphor layer includes a plurality of domains formed of a plurality of phosphor columnar crystals; each of the domains is a single phosphor columnar crystal or an aggregation of phosphor columnar crystals having substantially the same crystal orientation, and has an average diameter of 0.2 to 10 μm; and the phosphor columnar crystals are crystalline from root portion at which crystal growth started.

7 Claims, 4 Drawing Sheets

RADIATION IMAGE CONVERSION PANEL

TECHNICAL FIELD

The present invention relates to a radiation image conversion panel.

CROSS-REFERENCE TO RELATED APPLICATIONS

To present U.S. patent application claims a priority under the Paris Convention of Japanese patent application No. 2014-188949 filed on Sep. 17, 2014, the entirety of which is incorporated herein by references.

BACKGROUND ART

A digital radiation image detector represented by computed radiography (CR) and flat panel detector (FPD) is widely used in diagnostic imaging in hospital and clinic since it can directly obtain digital radiation images and can directly display the images on an image display equipment such as cathode tube and liquid crystal panel. Recently, a FPD utilizing a thin-film transistor (TFT) and a charge-coupled device (CCD) in combination is being popularized.

The FPD comprises a sensor panel (plane light receiving element) in which a light receiving element such as TFT and CCD is arranged two-dimensionally and a radiation image conversion panel in which a phosphor layer for converting radiation into light detectable by a light receiving element is formed on a support. Recently, further improvements of function are being attempted by constituting the phosphor layer in a multilayer manner.

For example, Patent Literature 1 discloses a radiation image conversion panel comprising a sensor panel and a phosphor layer formed on the sensor panel, the radiation image conversion panel having a structure wherein the phosphor layer has a columnar portion formed by groups of columnar crystals formed by columnar growth of phosphors and a non-columnar portion and wherein the non-columnar portion closely contacts with the sensor panel and the columnar portion is formed thereon toward the crystal growth direction.

Patent Literature 2 discloses a radiation image conversion panel comprising a support and a phosphor layer formed on the support, the radiation image conversion panel having a structure wherein the phosphor layer comprises a plurality of columnar crystals in which phosphor crystals are laminated in columnar shape, and wherein the columnar crystals have a columnar structure at the root side fixed on the support and have a structure forming a helical structure thereon.

Patent Literature 3 discloses a radiation image conversion panel comprising a support and a phosphor layer comprising phosphor columnar crystals on the support, wherein the degree of orientation of plane index (200) of the phosphor columnar crystal determined by X-ray diffraction method is from 80 to 100%.

Patent Literatures 1 and 2 are examples of those in which a role of diffuse reflection layer is imparted to a lower layer of a phosphor layer, but it has become understood that a part of the lower layer becomes amorphous resulting in decreasing luminance or affecting the crystallinity and the crystal diameter distribution of the upper columnar crystals which will grow subsequently.

On the other hand, Patent Literature 3 discloses an example in which plane index determined by X-ray diffraction is oriented toward (200) at any position in the film thickness direction, but characteristics such as luminance and MTF and a crystalline state in the very early stage of crystal growth which has a big influence especially on film adhesion have not been mentioned. Evaluation by the average of X-ray diffractions at the position where effective thickness of sample is relatively large and which is about 10 µm to the thickness direction did not lead to sufficient understanding of the important state in the very early stage of crystal growth. Techniques for controlling the very early part of crystal growth is important, and the necessity is increasing.

PRIOR ART REFERENCES

Patent Documents

Patent Literature 1: Japanese Patent No. 5286437
Patent Literature 2: Japanese Laid-open Patent Application No. 2011-27569
Patent Literature 3: WO 2011/89946

SUMMARY OF THE INVENTION

Problems to be Solved in the Invention

An object of the present invention is to provide a radiation image conversion panel having characteristics such as luminance and sharpness while maintaining an excellent film adhesion.

Means for Solving the Problems

To achieve at least one of the abovementioned objects, a radiation image conversion panel reflecting one aspect of the present invention comprises a support; and a phosphor layer mainly composed of an alkali halide, the phosphor layer being formed by vapor deposition; wherein the phosphor layer comprises a plurality of domains formed of a plurality of phosphor columnar crystals; each of the domains is a single phosphor columnar crystal or an aggregation of phosphor columnar crystals having substantially the same crystal orientation, and has an average diameter of 0.2 to 10 µm; and the phosphor columnar crystals are crystalline from root portion at which crystal growth started.

Effect of the Invention

The radiation image conversion panel of the present invention has a phosphor layer which is crystalline from root portions of columnar crystals and can excellently maintain the adhesion between the phosphors or the like and a support, that is film adhesion.

Thus, according to the present invention, a radiation image conversion panel excellent in luminance and sharpness can be provided.

DESCRIPTION OF EMBODIMENTS

Figure 1:
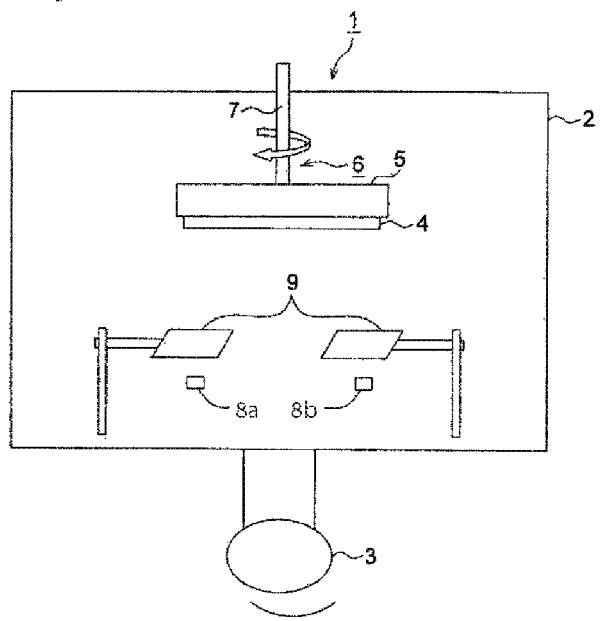
FIG. 1 is a cross-sectional view a showing schematic configuration of an example of vapor deposition apparatus used for the present invention.
Figure 2:
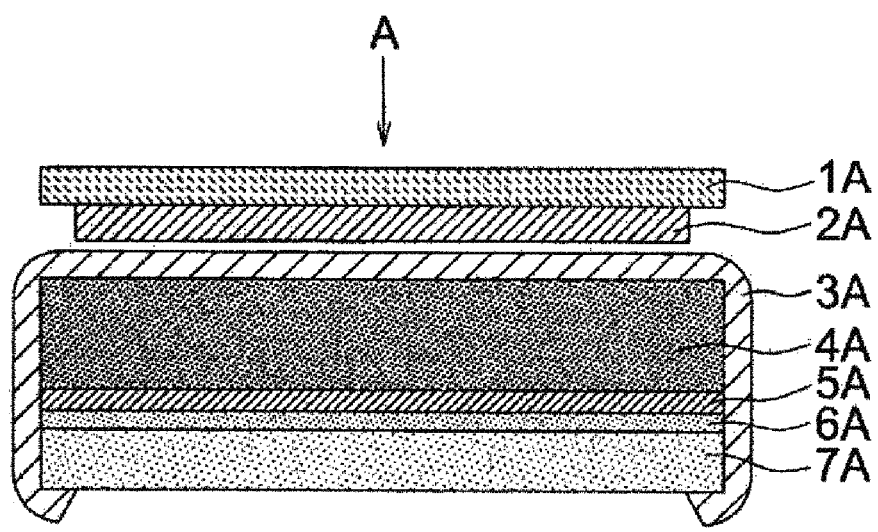
FIG. 2 is a cross-sectional view showing an embodiment of the radiation image conversion panel of the present invention.
Figure 3:
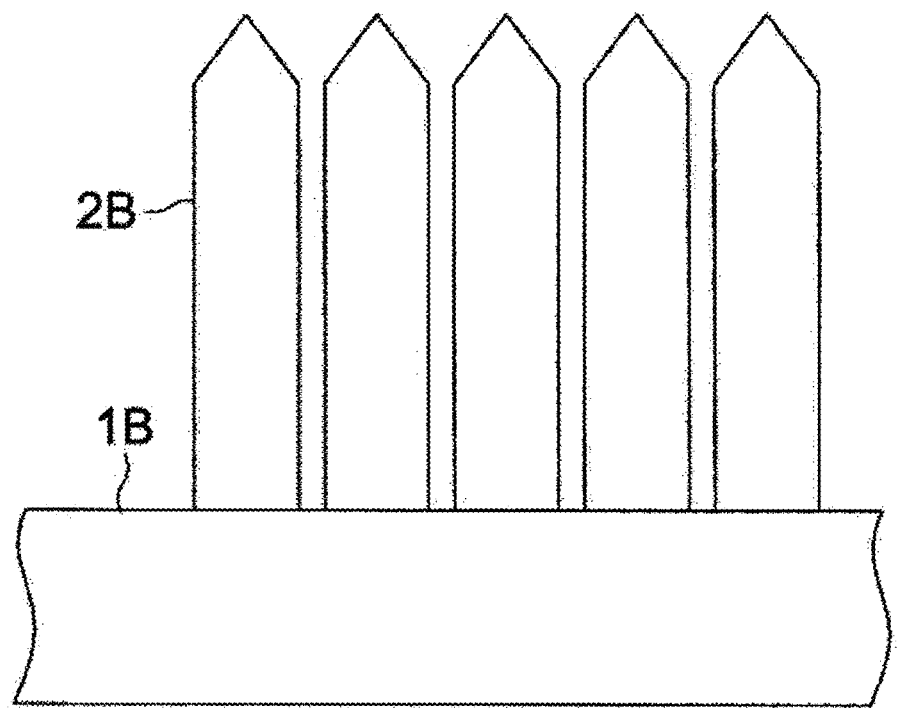
FIG. 3 is a schematic view representing the shape of a phosphor columnar crystal formed on a vapor deposition substrate.

The radiation image conversion panel of the present invention is now described in detail. Radiation image conversion panel is herein also referred to as "scintillator panel."

Support

The term "support" as used in the present invention refers to a member playing a dominant role in components of a radiation image conversion panel to hold a phosphor layer.

The support may employ various materials without restriction as long as they can transmit radiation such as X-ray and can hold a phosphor layer.

As the material constituting the support of the present invention, for example, (1) carbon fiber reinforced plastics (CFRP), (2) carbon (such as those obtained by solidifying amorphous carbon, charcoal or paper through carbonization), (3) plastic, (4) glass, (5) metal, (6) composite material, and (7) those in which the material as described in (1) to (6) is formed thin and sandwiched with foamed resins may be used. These may be used solely or as a laminate thereof.

In the present invention, among these, the resin film of the (3) plastic is preferably used. Use of the resin film leads to having such advantages that (i) the other layer hereinbelow, for example, functional layer such as reflection layer, conductive layer and adhesion-promoting layer can be processed using roll to roll method, (ii) that the layer can be easily cut into the product size before or after carrying out vapor deposition of phosphors, and (iii) that when coupling scintillator panel and sensor panel (plane light receiving element), the panel is excellent in adherence with the sensor panel by virtue of its flexibility.

Examples of the resin film include sheets such as polyethylene terephthalate, polyethylene naphthalate, cellulose acetate, polyamide, polyimide, polyetherimide, epoxy resin, polyamide imide, bismaleimide resin, fluorocarbon resin, acrylic resin, polyurethane, aramid, nylon, polycarbonate, polyphenylene sulfide, polyethersulfone, polysulfone, polyether ether ketone, liquid crystal polymer and carbon fiber reinforced resin. These polymers or resins may be used solely or as a laminate of the plural polymers or resins. Polyimide is especially preferred because the glass transition point of a support preferably is 100° C. or higher such that the support does not deform by heat when carrying out vapor deposition of phosphors onto the support.

The thickness of the support is generally from 20 μm to 3 mm, preferably from 20 to 1000 μm, more preferably from 50 to 750 μm. In the case that the thickness of the support is within the range, when a sensor panel and a scintillator panel are joined together, the support can be bend flexibly depending on the thickness distribution of the phosphor layer to fit the sensor panel and the phosphor layer closely. Especially when the thickness of the support is not less than 20 μm, ease of handling after forming a phosphor layer is promoted. When the thickness of the support is not more than 3 mm, a functional layer such as reflection layer, conductive layer and adhesion-promoting layer can be easily processed in roll to roll method, which is very useful from the viewpoint of improving productivity.

The support used in the present invention has flexibility in general. The term "flexibility" means a property of being bendable or deflectable, and the term "support having flexibility" means a support whose elastic modulus is from 0.1 to 20 GPa.

The term "elastic modulus" as used in the present invention is calculated as the slope of the stress against the amount of strain in the region showing a linear relationship between strain shown by a reference line of test piece in accordance with JIS C 2318 using a tensile testing machine and corresponding stress, which is also referred to as a Young's modulus. In the present invention, such a Young's modulus is defined as the elastic modulus unless otherwise restricted.

In the present invention, "support having flexibility" exhibiting an elastic modules of not less than 10 GPa is referred to as rigid plate. Examples of the rigid plate include a metal, glass, carbon and composite materials.

The support can be used without specific restrictions.

Phosphor Layer

In the present invention, a phosphor layer comprising alkali halide as main component is used. The phrase "comprising alkali halide as main component" means that an alkali halide is a phosphor matrix compound.

Examples of an alkali halide include cesium halide such as cesium iodide (CsI) and cesium bromide (CsBr). Among these, cesium iodide is preferable since it exhibits a relatively high conversion factor from X-rays to visible light, and easily form a columnar crystal structure from a phosphor material by vapor deposition, and inhibit scattering of emitted light within the crystal through an optical guiding effect, and increase the thickness of a phosphor layer.

However, because cesium iodide alone results in reduced emission efficiency, various activators are added to phosphor materials in addition to cesium iodide which is a phosphor matrix compound. For example, JP 54-035060 B describes a phosphor material obtained by mixing cesium iodide and sodium iodide (NaI) at an arbitrary ratio. JP 2001-59899 A describes a phosphor layer obtained by depositing CsI with an activator such as thallium (Ti), europium (Eu), indium (In), lithium (Li), potassium (K), rubidium (Rb) or sodium (Na). When a photostimulable phosphor such as cesium bromide is used as a phosphor matrix compound, europium (Eu) or the like can be used as the activator. In the present invention, thallium (Tl) is especially preferred as the activator.

A thallium compound as an activator is a compound having oxidation number of +I or +III, and specifically includes thallium iodide (TlI), thallium bromide (TlBr), thallium chloride (TlCl), thallium fluoride (TlF, TlF) and the like. In the present invention, a preferred thallium compound is thallium iodide (TlI).

The melting point of the thallium compound is preferably within the range from 400 to 700° C. If the melting point is higher than 700° C., the activators exist inhomogeneously within the columnar crystal, resulting in decreased emission efficiency. In the present invention, melting point refers to a melting point under ordinary temperature and pressure.

The content of the thallium compound, which is desirably optimized in accordance with its purpose or performance, is generally from 0.001 to 50 mol % of the content of cesium iodide, and preferably from 0.1 to 10.0 mol %. The content of thallium compound preferably is not less than 0.001 mol % of the content of cesium iodide, which results in increased emission luminance compared to using cesium iodide alone to achieve the desired emission luminance. The content of thallium compound also preferably is not less than 50 mol %, which can maintain the property and function of cesium iodide.

The phosphor layer according to the present invention is composed of cesium iodide as a phosphor matrix compound and thallium compound as an activator. The coefficient of variation of the thallium concentration within the phosphor layer is generally not more than 40%, preferably not more than 30%, more preferably not more than 20%, especially preferably not more than 10%. Specifically, the thallium-activated cesium iodide (CsI:Tl) is preferable because it has a broad emission wavelength from 400 to 750 nm.

In the present invention, the coefficient of variation (CV) of the thallium concentration within the phosphor layer is determined as follows. That is, samples are collected by 0.2 g from each of arbitrary 30 areas of phosphor layer and subjected to ICP optical emission spectrometry to determine standard deviation (SD) for the thallium concentrations in the samples from the 30 areas, and the standard deviation (SD) is divided by average value of thallium concentrations from the 30 areas to obtain coefficient of variation (CV) represented by the formula below.

Coefficient of variation (CV)=standard deviation (SD) of thallium concentrations/average value of thallium concentrations×100

In other words, coefficient of variation is standard deviation divided by average value multiplying by 100.

In the phosphor layer according to the present invention, the root portion of its phosphor layer columnar crystal is preferably a layer not containing a thallium compound. Such a layer can be formed as follows, for example.

First, a phosphor crystal (cesium iodide only) is formed on a support using cesium iodide until the phosphor crystal reaches a desired thickness by a vapor phase deposition method, particularly vapor deposition method, and then a phosphor material composed of cesium iodide and thallium compound (e.g., CsI: 0.003Tl) is deposited on the phosphor crystal until the phosphor material reaches a desired thickness to form a phosphor columnar crystal. The obtained phosphor columnar crystal is a phosphor layer in the present invention.

The term "root portion" herein refers to a portion which is formed early in the process for forming a phosphor columnar crystal by a vapor deposition method wherein the length of the crystal portion is, in general, less than 50% of the average length of the phosphor columnar crystal (vertical length). The term "layer not containing a thallium compound" means a crystal part of a phosphor columnar crystal formed by the method as described above which is substantially free of thallium compound and includes, in addition to a layer composed of only cesium iodide, a layer which contains a thallium compound, other impurities and additives whose content is less than 0.1% by mass relative to the mass of the root portion of the phosphor columnar crystal. The layer not containing a thallium compound is formed preferably at the part of not more than 30% of the average length of phosphor columnar crystals in a phosphor layer, more preferably at the part of not more than 10%.

When a phosphor layer is divided into 10 layers in the plane parallel to a reflection layer hereinbelow described and the concentrations of activators in each of the layers are defined as y1, y2, y3, y4, y5, y6, y7, y8, y9 and y10 (mole %) in the order from the support side, and when the maximum value of from y2 to y10 is defined as y (max) and the minimum value is defined as y (min), then a distribution representing y (max)≤1.2y1 and 0.1y1≤y (min) may be obtained.

Thus, when the root portion of the phosphor layer columnar crystal solely comprises phosphor matrix compound or when the concentration of a activator is decreased, crystalline phosphor layer can be formed from the root portion and luminance and sharpness of a radiation image conversion panel can be improved.

A degree of orientation of a plane having a constant plane index based on X-ray diffraction method in a phosphor layer is preferably within a range from 80 to 100% regardless of the thickness direction. For example, plane index for thallium-activated cesium iodide (CsI: Tl) may be any of (100), (110), (111), (200), (211), (220), (311) and the like, which preferably is (200) (for plane index, see "Instruction for X-ray analysis" (Tokyo Kagaku Dojin), p 42-46). The phrase "degree of orientation of a plane having a constant plane index based on X-ray diffraction method" herein refers to a ratio of an intensity of one plane index (Ix) to the total intensity (I) of the whole including planes having other plane index. For example, the degree of orientation of the intensity of plane (200) (I200) based on X-ray diffraction spectrum is "degree of orientation=I200/I."

A plane index for determining the degree of orientation and a measurement method therefor include X-ray diffraction (XRD). X-ray diffraction is a versatile analytical method which takes advantage of a diffraction satisfying Bragg equation by radiation of characteristic X-ray having a specific wavelength to a crystalline material, by which findings of the material identification and the structure of the crystal phase can be obtained. As a target for irradiation system, Cu, Fe, Co or the like is used, and irradiation output, depending on the capability of equipment, is generally about 0 to 50 mA and about 0 to 50 kV.

As mentioned above, a phosphor layer preferably is a columnar crystal which can reduce scattering of emitted light within the crystal. Example for forming a phosphor columnar crystal includes vapor phase deposition method. Examples of vapor phase deposition method include vapor deposition method, sputtering method, CVD method, ion plating method and the other methods, and especially preferred is vapor deposition method.

The thickness of a phosphor layer is usually from 100 to 800 μm, preferably from 120 to 700 μm from the viewpoint of being able to obtain well-balanced characteristics of luminance and sharpness.

In the present invention, the tip angle of a phosphor columnar crystal is controlled into usually from 40 to 80 degree, preferably from 50 to 75 degree.

Thus, the tip angle is controlled into the range to increases the light extraction efficiency, so that a radiation image conversion panel to be obtained will be one excellent in luminance and sharpness.

In the present invention, when a phosphor layer is formed on a support, a base layer may be formed. The base layer comprises a phosphor matrix compound and an activator and is a layer with a porosity lower than the phosphor layer, which is also referred to as a first phosphor layer. In this case, a method for forming a phosphor layer is a method capable of forming a phosphor layer satisfying the requirements for plane index and preferably comprises a step of forming a base layer on a support surface whose porosity shows a value lower than the phosphor layer, and a step of forming a phosphor material on the base layer surface by vapor phase deposition method.

Porosity as used herein refers to a ratio of a void area to the total sum of a cross-section area of a columnar crystal and the void area in a cross-section obtained by cutting a phosphor layer in parallel to a support. Porosity can be determined by cutting a phosphor layer of a scintillator panel in parallel to a support and binarizing a scanning electron micrograph (SEM) image of the cross-section for distinguishing between the phosphor part and the void part using an image processing software.

From the viewpoint of crystallinity improvement and adhesiveness of a columnar crystal to be grown on a base layer, it is preferred that a base layer has a relative density lower than that of a phosphor layer and that a relative content of an activator contained in the base layer is lower than a relative content of an activator contained in the phosphor layer. Specifically, ratio of a relative density of a base layer to a relative density of a phosphor layer ((relative density of a base layer)/(relative density of a phosphor layer)) is preferably from 0.92 to 0.98. In this case, a method for forming a phosphor layer is a method capable of forming a phosphor layer satisfying the requirements for plane index and preferably comprises a step of forming a base layer in which a relative content of an activator therein shows a value lower than a relative content in a phosphor layer on a support and a step of forming a phosphor layer having a relative density higher than that of the base layer by laminating a phosphor material on the base layer surface by vapor deposition method.

As used herein, relative density (%) means a relative value (percentage) of an actual density of each layer (base layer or phosphor layer) (g/cm$^3$) to a specific density of a phosphor (g/cm$^3$).

Thickness of a base layer is usually from 0.1 to 50 μm, preferably from 5 to 40 μm from the viewpoint of maintaining high luminance and sharpness. However, the thickness may be appropriately changed depending on a crystal diameter of a phosphor columnar crystal and a thickness of a phosphor layer.

In the present invention, the existence of a base layer leads to improved columnar crystallinity of a phosphor layer, increased amount of emitted light, improved luminance of a scintillator panel, and improved preservability.

Columnar crystals contained in a phosphor layer (including base layer) have an average equivalent circle diameter (a) at the site 10 μm from the side of reflection layer hereinbelow described and an average equivalent circle diameter (b) on the outermost surface, which usually have a relation of $1.55 \leq b/a \leq 30$.

Further, from the viewpoint of sharpness, a thickness of a base layer (c) and a thickness of a phosphor layer (d) usually have a relation of $3 \leq d/c \leq 1000$, preferably $10 \leq d/c \leq 1000$.

There are a number of description on the definition of crystal diameter (domain diameter) of a phosphor columnar crystal, but since a columnar crystal grows while combining with contiguous crystals, the border between crystals in the state before complete combination can not be determined only by observation with SEM. For a method for measuring the crystal diameter particularly during the growth, methods in which SEM observation is carried out in the cross-section perpendicular to the growth direction of columnar crystal have been demonstrated in the conventional technology, but crystalline interface can not be visualized by observation with the conventional secondary electron image because crystals exist in the state wherein a part or most of them join together with surrounding crystals, which in practice leads to difficulty in determining crystal diameter.

Columnar diameter of a columnar crystal is preferably defined based on the crystal orientation. In general, a method is known using a contrast generated in SEM image and scanning ion microscopy (SIM) image due to the difference of crystal orientation when observing a crystalline sample. By electron or ion channeling, the penetration depth to the sample is varied according to the difference of crystal orientation, which results in variation in emission quantity of reflected electron or secondary electron, thereby generating the contrast. As described in JP 2012-251974 A, parts of needle crystal scintillator contact with the upper surface having a protrusion pattern and the number is defined by ion channeling contrast. The ion channeling contrast is a contrast generated by the difference of crystal orientation, and an image can be obtained by scanning the surface of sample with gallium (Ga) ion beam on a focused ion beam (FIB) device and detecting the emitted secondary electrons. In the case utilizing SEM, electron channeling contrast can be obtained, but in usual pretreatment and observation condition, clear channeling contrast can not be obtained. For example, an electron channeling contrast image can be obtained by preparing a smooth and damage-free cross-section of crystal by ion polishing or the like and observing reflected electron components without electroconductive treatment. However, since crystal orientation difference and contrast difference are not corresponded in the channeling contrast by ion or electron, and since change in incident electron angle also changes contrast, quantitative definition of crystal diameter is also difficult.

On the other hand, in fields such as metallic material, EBSP (Electron Back Scattering Pattern) method is used for crystal orientation analysis. The method is appropriate for conductive material since electroconductive treatment should not be conducted on the material surface in order to obtain a clear EBSP pattern. It has been found that the method can be applied for readily-damaged materials such as alkali halide for the reasons that electron microscopes equipped with a function enabling observation while preventing charge up by low vacuum mode are in widespread use in recent years, that a method using ionic liquid was developed, and that influences of charge can be suppressed by using samples just after ion polishing, and by other various devices.

Specific procedures may be carried out as follows. Voids in phosphor columnar crystals adhering to a support is filled with resin to be fixed, and then a cross-section in the desired direction (vertical or parallel to the crystal growth direction) is prepared by using a polishing apparatus using broad argon ion beam. When the average diameter of a domain of the phosphor columnar crystals is determined, a cross-section may be prepared in the direction perpendicular to the direction of crystal growth, and when crystalline state at the portion at which crystal growth started is confirmed, a cross-section parallel to the crystal growth direction, i.e., perpendicular to the support (vapor deposition substrate) may be prepared. Immediately after polishing, the cross-section is introduced into SEM equipped with an EBSP detector and EBSP measurement is carried out for not less than 5 visual fields of 20 μm×20 μm areas in 0.1 μm step at an accelerating voltage of 20 kV. Clean-up treatment is carried out by Grain Dilation method and crystal orientation is determined. As the apparatus and the analytical tool, for example, SEM (SUPRA40VP produced by ZEISS LTD.), EBSP detector (Hikari High Speed EBSP Detector produced by EDAX(TSL) LTD.), EBSP analysis software (OIM Analysis produced by TSL Solutions LTD.) or the like may be used.

The term "domain" herein refers to a single phosphor columnar crystal or an aggregation of phosphor columnar crystals having substantially the same crystal orientation (i.e., having a crystal orientation difference within 5 degree). The average diameter of domains is from 0.2 to 10 µm, preferably from 0.2 to 7 µm. The average diameter of domains in the thickness range from the portion at which crystal growth started to 50 µm is preferably from 0.3 to 3 µm, more preferably from 0.3 to 1 µm.

The coefficient of variation is preferably not more than 50%, more preferably 35%.

As used in the present invention, the phrase "crystalline from the root portion at which crystal growth started" of a phosphor columnar crystal means that when a cross-section parallel to the crystal growth direction is prepared to obtain a EBSP pattern, a clear EBSP pattern can also be obtained from the root portion at which crystal growth started. In the case of amorphous, clear EBSP pattern can not be obtained.

In not less than 60% of the total phosphor projected area in a cross-section perpendicular to the direction of crystal growth within the range of thickness from the root portion of a phosphor columnar crystal to 50 µm, the (200) crystal orientation determined by crystal orientation analysis using EBSP pattern is not more than 10 degree, preferably not more than 5 degree. The (200) crystal orientation determined by crystal orientation analysis is within the range so that the adhesiveness between a support and a phosphor or the like, i.e., the film adhesion can be excellently maintained and a radiation image conversion panel excellent in luminance and sharpness can be presented.

Other Layers
Under Coating Layer

In order to improve the adhesiveness between a support and a phosphor layer, an under coating layer is preferably placed between a support and a phosphor layer. An under coating layer plays important roles for a phosphor layer in growing crystalline columnar crystals from its root portion and having good adhesion (film adhesion) with a support. In other words, a phosphor layer in the present invention is preferably formed on an under coating layer surface via the thin under coating layer formed on the support surface.

In such a case where a phosphor layer is formed via an under coating layer, the adherence between the phosphor and the under coating layer, i.e., film adhesion, is significantly changed according to the physical property of the surface portion of the under coating layer (physical property of under coating). A property due to the variation in a surface physical property of an under coating layer is elastic modulus. Since the under coating layer is very thin and the elastic modulus remarkably varies depending on the initial formed state even if the thickness is the same, it is not appropriate for measuring the property of an under coating layer to adopt the method for measuring elastic modulus which have been adopted conventionally and generally such as JIS C 2318. Especially, the film adhesion are greatly influenced by the elastic modulus of the under coating layer surface portion at the temperature in the very early stage of vapor deposition for the under coating layer. In other words, a local elastic modulus of the under coating layer of the present invention behaves widely and does not correspond to a elastic modulus of a thick member. When local viscoelastic behavior is measured as in the under coating layer of the present invention, more precise properties can be obtained by adopting nanoindentation (indentation) method suitable for measuring local mechanical properties rather than conventional methods.

The nanoindentation method employed herein is a method comprising continuously measuring indentation load and indentation depth of a trigonal pyramid indenter on a material and determining hardness (indentation hardness), complex elastic modulus, yield stress and the like of the material from the curve depicting relation of indentation load to indentation depth of a trigonal pyramid indenter. The nanoindentation method can estimate various dynamic properties depending on the type of indenter to be used, and can estimate physical properties of under coating at the initial temperature of a vapor deposition by measurement at appropriate indentation load using an environmental control nanoindenter which can control sample temperatures and a trigonal pyramid indenter (Berkovich indenter). Thus, in the nanoindentation method employed in the present invention, visual observation using a light microscope or the like is not carried out.

For a nanoindentation method employed in the present invention, an specific example of method for measurement will now be described.

Triboscope produced by Hysitron is used as the apparatus and was placed in an environment control chamber, then samples are set to be a desired temperature. As a trigonal pyramid indenter, Berkovich indenter (trigonal pyramid indenter: made of triangular pyramidal diamond) is used. Samples are fixed on the stage, and indentation measurements are carried out 3 times respectively. As for the condition, loading is carried out to the maximum indentation depth of 300 nm at the indentation rate of 300 nm/sec and unloading is carried out at the same rate. The obtained load-displacement curve is analyzed to calculate hardness and complex elastic modulus. Measurement values are corrected based on a standard sample of fused quartz.

In the present invention, a material of an under coating layer is used wherein the elastic modulus of the under coating layer at an initial substrate temperature measured by nanoindentation method is usually from 1 to not more than 15 GPa, preferably from 1 to 10 GPa.

By forming an under coating layer using those materials wherein the elastic modulus of the under coating layer at an initial substrate temperature measured by nanoindentation method is within the range, a domain which is an aggregation of phosphor columnar crystals has an average diameter of 0.2 to 10 µm, preferably an average diameter of 0.2 to 7 µm as described above. Furthermore, the average diameter of each of the domain in the thickness range from the root portion from which crystallization starts to 50 µm is from 0.3 to 3 µm, preferably from 0.3 to 1 µm, and the coefficient of variation is within the range not more than 50%, preferably 35%. Further, the shape of the crystal structure becomes very uniform, and in not less than 60%, preferably not less than 75% of the total phosphor projected area in a cross-section perpendicular to the crystal within the range of thickness from the root portion to 50 µm, the slope of (200) crystal orientation in crystal orientation analysis measured by EBSP (Electron Back Scattering Pattern) method is within the range usually not more than 10%, preferably not more than 6%.

In the present invention, examples of a material for forming an under coating layer as described above include polymeric binders (herein also referred to as "binder") such as polyurethane, vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral, polyester, Vylon™, cellulose derivatives (such as nitrocellulose), styrene-butadiene copolymer, various types of synthetic rubber resins, phenol resin, polyparaxylylene, epoxy resin, urea resin, melamine resin, phenoxy resin, silicone resin, acrylic resin and urea-formamide resin. Among these, polyurethane, polyester, Vylon™, polyparaxylylene, silicone resin, acrylic resin and polyvinyl butyral are preferred. Two or more of these binders may be used in combination.

The glass transition temperature (Tg) of a binder is preferably not more than 100° C. from the viewpoint of improving the adhesiveness between a support and a phosphor layer.

In order to assist reflection of emitted light, white pigment can be blended to the under coating layer of the present invention. Example of the white pigment used herein may include titanium oxide (IV) ($TiO_2$). For example, a curing agent is added to a polyester such that elastic modulus at the initial substrate temperature is within the range from 1 to 15 GPa, preferably from 1 to 10 GPa and titanium oxide(IV) ($TiO_2$) is added to the polyester in an amount within the range from 100 to 5000 parts by weight with respect to 100 parts by weight of resin, then the mixture is cured such that the thickness of a base layer is preferably from 1 to 50 μm thickness. The amount of the curing agent to be blended is adjusted such that the glass transition temperature (Tg) of the resin which forms an under coating layer at this point is from 0 to 50° C., preferably from 5 to 40° C.

Examples of the curing agent used herein in forming an under coating layer which comprises a polyester include isocyanates and melamine compounds. When forming an under coating layer with other materials, the elastic modulus determined by nanoindentation method at an initial substrate temperature using an appropriate amount of curing agent corresponding to the material is adjusted to be within the range.

In the present invention, an under coating layer may be formed by gas phase method in addition to by other forming methods comprising applying a polymeric binder dissolved or dispersed into a solvent and drying. In other words, for example for a coating method of an under coating layer, in addition to a common method such as gravure, die, comma, bar, dip, spray and spin coating, methods such as CVD method may also be employed.

Examples of the solvent which can be used for forming an under coating layer, lower alcohols such as methanol, ethanol, n-propanol and n-butanol; chlorine atom-containing hydrocarbons such as methylene chloride and ethylene chloride; ketones such as acetone, methyl ethyl ketone, methyl isobutyl ketone and cyclohexanone; cyclohexane; aromatic compounds such as toluene, benzene and xylene; esters between lower fatty acid and lower alcohol such as methyl acetate, ethyl acetate and butyl acetate; ethers such as dioxane, ethylene glycol monoethyl ether, ethylene glycol monomethyl ether, methoxypropanol, propylene glycol monomethyl ether and propylene glycol monomethyl ether acetate, and mixtures thereof.

The thickness of an under coating layer is usually from 0.1 to 10 μm, preferably from 0.5 to 5 μm. Adjustment of the thickness of an under coating layer to not less than 0.1 μm results in improved adhesiveness with phosphor layer, and adjustment of the thickness of an under coating layer to not more than 10 μm results in reduced light scattering within the under coating layer and improved sharpness.

The under coating layer of the present invention may contain a pigment such as titanium oxide or a dye in order to prevent light emitted from a phosphor layer from scattering and improve sharpness or the like.

For an under coating layer in the early stage formed by the method described above, by adjusting the hardness of the under coating layer measured by nanoindentation method into the range usually from 1 to 15 GPa, preferably from 1 to 10 GPa as descried above, the film adhesion of a phosphor layer formed on the surface can be excellently maintained. Therefore, according to the present invention, a radiation image conversion panel excellent in luminance and sharpness can be provided.

Reflection Layer

In addition to an under coating layer, a reflection layer is preferably provided between a support and a phosphor layer. Specifically, a reflection layer is preferably provided between a support and an under coating layer. By providing a reflection layer, emitted light in a phosphor layer can be extracted in extremely high efficiency and luminance is remarkably improved.

Materials constituting a reflection layer include metallic materials such as aluminum, silver, platinum, palladium, gold, copper, iron, nickel, chromium, cobalt and stainless. Among these, from the viewpoint of reflectance or corrosion resistance, metallic materials comprising as main component aluminum or silver are especially preferred. Two or more layers of thin films comprising such metallic materials may be formed.

Methods for coating the metallic material on a support is not especially restricted, including vapor deposition, sputtering, or lamination of metallic foils, and sputtering is most preferred from the viewpoint of adherence.

Materials constituting a reflection layer include metal oxide and light scattering particle in addition to the metallic materials. In other words, a reflection layer may be formed by applying a mixture prepared by blending metal oxide, light scattering particle and the like to a binder.

Examples of the metal oxide, from the viewpoint of improving reflectance, include metal oxides such as silica ($SiO_2$) and titanium oxide (IV) ($TiO_2$). These metal oxides may be used individually or two or more of them may be used in combination.

As the light scattering particle, for example, white pigments such as titanium oxide (IV) ($TiO_2$) (anatase-type, rutile-type), magnesium oxide (MgO), lead (II) carbonate hydroxide ($PbCO_3.Pb(OH)_2$), barium sulfate ($BaSO_4$), aluminum oxide ($Al_2O_3$), M(II)FX (wherein M(II) is at least one kind of atom selected from barium, strontium and calcium, and X is chlorine atom or bromine atom), calcium carbonate ($CaCO_3$), zinc oxide (ZnO), antimony trioxide ($Sb_2O_3$), silica ($SiO_2$), zirconia ($ZrO_2$), lithopone ($BaSO_4.ZnS$), magnesium silicate, basic silicate sulfate, basic lead phosphate, and aluminum silicate may be used. Among these, preferred crystal structure of titanium oxide (IV) is rutile type in that ratios to the refractive indexes of various resins are large and high luminance can be achieved. Specific examples of titanium oxide (IV) include CR-50, CR-50-2, CR-57, CR-80, CR-90, CR-93, CR-95, CR-97, CR-60-2, CR-63, CR-67, CR-58, CR-58-2, CR-85 produced by hydrochloric acid-based method, R-820, R-830, R-930, R-550, R-630, R-680, R-670, R-580, R-780, R-780-2, R-850, R-855, A-100, A-220, W-10 produced by sulfuric acid-based method (the above is trademark: produced by Ishihara Sangyo Ltd.) and the like. The primary particle size of the titanium oxide (IV) is usually from 0.1 to 0.5 μm, preferably from 0.2 to 0.3 μm. Titanium oxide (IV) which is surface treated by oxides of aluminum, silicon, zirconium and zinc or the like is especially preferred since it improves affinity or dispersibility with polymer, or it suppress degradation of polymer.

The titanium oxide (IV) is contained in a reflection layer usually in an amount from 40 to 95% by weight, preferably from 60 to 90% by weight. If the content of titanium oxide (IV) is less than 40% by weight, luminance may be decreased, and if the content is over 95% by weight, adhesiveness with a support or a phosphor layer may be decreased.

Since these white pigments have a high hiding power and a high refractive index, they can easily scatter emitted light in a phosphor layer by reflecting or refracting light, so that the obtained radiation image conversion panel has a remarkably improved sensitivity.

As the other light scattering particles, for example, glass bead, resin bead, hollow particle having a hollow portion within the particle, multi-hollow particle in which a number of hollow portions exist within the particle, and porous particle may be used.

The light scattering particles may be used individually or in combination.

Examples of the binder include easily adhesive polymers, including polyurethane, vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral, polyester, cellulose derivative (such as nitrocellulose), styrene-butadiene copolymer, various types of synthetic rubber resin, phenol resin, epoxy resin, urea resin, melamine resin, phenoxy resin, silicone resin, acrylic resin and urea-formamide resin. Among these, polyurethane, polyester, silicone resin, acrylic resin and polyvinyl butyral are preferably used. Two or more of these binders may be used in combination.

A coating type reflection layer can be formed by applying and drying a composition containing at least light scattering particle, binder and solvent. For a coating method, not particularly restricted, a common method such as gravure, die, comma, bar, dip, spray and spin coating may be employed.

Examples of the solvent which can be used for forming a reflection layer, lower alcohols such as methanol, ethanol, n-propanol and n-butanol; chlorine atom-containing hydrocarbons such as methylene chloride and ethylene chloride; ketones such as acetone, methyl ethyl ketone, cyclohexane and methyl isobutyl ketone; aromatic compounds such as toluene, benzene and xylene; cyclohexane; esters between lower fatty acid and lower alcohol such as methyl acetate, ethyl acetate and butyl acetate; ethers such as dioxane, ethylene glycol monoethyl ether, ethylene glycol monomethyl ether, methoxypropanol, propylene glycol monomethyl ether, propylene glycol monomethyl ether acetate; and mixtures thereof.

A dispersing agent can be used to improve dispersibility of titanium oxide. As the dispersing agent, for example, polyhydric alcohol, amines, silicone or surfactant is used.

It is preferred that a thickness of a reflection layer is usually from 0.005 to 0.3 µm, preferably from 0.01 to 0.2 µm from the viewpoint of extraction efficiency of emitted light.

A surface reflectance of a reflection layer is usually not less than 80%, preferably not less than 90%.

In order to improve adherence between a support and reflection layer, a further middle layer is preferably provided between a support and a reflection layer. As a material constituting the middle layer, in addition to common easily adhesive polymers, a dissimilar metal layer which is different from the reflection layer may be provided. As a dissimilar metal layer, for example, at least one kind of metal selected from nickel, cobalt, chromium, palladium, titanium, zirconium, molybdenum and tungsten is preferably used, and among these, nickel and/or chromium is preferably used individually or in combination.

Other Functional Layers

On a support, various functional layers such as adhesion-promoting layer, reflection layer, light absorbing layer, conductive layer, warpage prevention layer and smooth layer can be provided. For example, when forming a warpage prevention layer on a support to prevent the warpage of a radiation image conversion panel, a material having thermal expansion or thermal contraction characteristics different from that of the support can be adhered or coated to suppress the warpage of a scintillator panel.

In the present invention, those in which the other layers are provided on a support, on which a phosphor layer is planned to be formed is also referred to as a vapor deposition substrate.

Process for Producing Radiation Image Conversion Panel

A process for producing a radiation image conversion panel of the present invention is preferably one for forming a phosphor layer by vapor phase deposition method comprising the steps of using a vapor deposition apparatus 1 having evaporation sources 8*a* and 8*b* and a support rolling mechanism 6 in a vacuum vessel 2 as shown in FIG. 1, placing a vapor deposition substrate 4 on the support rolling mechanism, and depositing a phosphor material while rotating the vapor deposition substrate 4.

The embodiment of the present invention will now be described.

Near the bottom surface within the vacuum vessel 2, the evaporation sources 8*a* and 8*b* are arranged at the positions facing each other on a circumference of a circle having the center axis perpendicular to the vapor deposition substrate 4. In this case, the distance between the vapor deposition substrate 4 and the evaporation sources 8*a* and 8*b* is usually from 100 to 1500 mm, preferably from 200 to 1000 mm. The distance between the center axis perpendicular to the vapor deposition substrate 4 and the evaporation sources 8*a* and 8*b* is usually from 100 to 1500 mm, preferably from 200 to 1000 mm.

In a production apparatus of the radiation image conversion panel of the present invention, 3 or more (e.g., 8, 16, 24) of evaporation sources can be provided, and each of the evaporation sources may be arranged at even intervals or with the intervals changed. A plurality of evaporation sources may be arranged concentrically, or concentric circles may be arranged doubly, triply or quadruply. The radius of the circle having the center axis perpendicular to the vapor deposition substrate 4 may be determined arbitrarily. Thus, by arranging a plurality of evaporation source doubly, triply or quadruply in a concentric pattern, a deposited film which is uniform in a region of large area can be formed, and for example two, four or nine scintillator panels can be prepared simultaneously even though only one panel could be prepared in one vapor deposition conventionally.

The phosphor material may be placed on a boat made of high melting point metal such as tungsten or tantalum and objected to resistance heating, or may be placed in a crucible made of ceramics such as carbon, silicon carbide, aluminum oxide, aluminum nitride, silicon oxide, silicon nitride or boron nitride and heated on a Knudsen cell (indirect heating evaporation source). In the boat or the crucible, a partition plate is preferably used at the opening in order to prevent particles which are produced when the filled phosphors are heated to cause bumping (splash) from linearly scattering through the opening to reach the material to be deposited (vapor deposition substrate). It is also effective in preventing the bumping (splash) to place a lid having a salient toward the inside and a perforation on the opening of the boat or the crucible so that the phosphor material within the boat or the crucible can not be seen from any place of the material to be deposited (vapor deposition substrate).

A method for heating the phosphor material in addition to the resistance heating method may be a method such as heating by an electron beam or heating by a high frequency induction, but in the present invention, a method comprising directly sending an electric current to perform resistance heating or a method comprising indirectly performing resistance heating by surrounding heaters is preferred from the viewpoint of ease of handling because of the relatively simple composition, inexpensiveness, and applicableness to numerous substances. The evaporation sources 8a and 8b may be a molecular beam source using a molecular beam epitaxial method.

In the vapor deposition apparatus 1, a plurality of evaporation sources 8a and 8b can be provided as described above to rectify the overlapping part of vapor flows from the evaporation sources 8a and 8b so that the crystallinity of phosphor materials deposited on the surface of the vapor deposition substrate 4 can be unified. If more evaporation sources are provided, vapor flows are rectified at more sites, so that the crystallinity of phosphor materials can be unified in the wide range of the surface of the vapor deposition substrate 4. By arranging the evaporation sources 8a and 8b on a circumference of a circle having the center axis perpendicular to vapor deposition substrate 4, an action and effect of uniformly growing crystal by rectification of vapor flow can be obtained isotropic ally on the surface of the vapor deposition substrate 4.

The support holder 5 is constituted to hold the vapor deposition substrate 4 such that the surface of the vapor deposition substrate 4 which forms the phosphor layer faces the bottom of the vacuum vessel 2 and is parallel to the bottom of the vacuum vessel 2.

The support holder 5 preferably comprises a heater which heat the vapor deposition substrate 4 (not shown). By heating the vapor deposition substrate 4 by the heater, enhancement of the adherence of the vapor deposition substrate 4 to the support holder 5 or adjustment of film quality of the phosphor layer is carried out. Adsorbates on the surface of the vapor deposition substrate 4 are separated and removed to prevent an impurity layer from generating between the surface of the vapor deposition substrate 4 and the phosphor layer.

A mechanism for circulating hot medium or heat medium (not shown) may be provided as a heating means. This heating means is appropriate when the temperature of the vapor deposition substrate 4 in depositing a phosphor material is kept at a relatively low temperature from 50 to 150° C. for vapor deposition. A halogen lamp (not shown) may also be used as a heating means, which is appropriate when the temperature of the vapor deposition substrate 4 in depositing a phosphor material is kept at a relatively high temperature of not less than 150° C. for vapor deposition.

Further, the support holder 5 is provided with a support rolling mechanism 6 for rotating the vapor deposition substrate 4 in a horizontal direction. The support rolling mechanism 6 comprises a support rotation axis 7 for supporting the support holder 5 and rotating the vapor deposition substrate 4 and a motor (not shown) which is arranged outside of the vacuum vessel 2 and acts as a driving source of the support rotation axis 7.

When heating the vapor deposition substrate 4, the vapor deposition substrate 4 may be closely contacted with the support holder 5 to be set together, or may be arranged apart from the support holder 5 and heated. When the vapor deposition substrate 4 is heated using the hot medium or heat medium, the vapor deposition substrate 4 is preferably contacted with the support holder 5 to be set together.

In the vapor deposition apparatus 1, in addition to the above configuration, the vacuum vessel 2 is provided with an evacuation pump 3. An evacuation pump exhausts gas present in a vacuum vessel, and two or more types of evacuation pumps which have different operating pressure areas may be arranged in order to exhaust gas to reach a high vacuum area. Examples of the evacuation pump which may be used include rotary pump, turbo-molecular pump, cryopump, diffusion pump and mechanical booster pump.

In order to control pressure in the chamber, a mechanism which can introduce gas into the vacuum vessel is provided. As gas to be introduced, for example, common inert gas such as neon, argon and krypton is used. The pressure in the vacuum vessel may be controlled by the amount of gas introduced into the vacuum vessel while exhausting gas from the vacuum vessel using the evacuation pump, or may be controlled by carrying out evacuation until achieving a higher vacuum than the desired pressure, then stopping the evacuation, followed by introducing gas until achieving the desired pressure. The pressure in the vacuum vessel may also controlled by providing a pressure control valve between the vacuum vessel and the evacuation pump to control the exhaust volume of the pump.

Between the evaporation sources 8a and 8b and the vapor deposition substrate 4, shutters 9 which shut off the space from the evaporation sources 8a and 8b to the vapor deposition substrate 4 are provided openably in a horizontal direction. The shutter 9 can prevent substances other than the desired substance adhering on the surface of the phosphor material from evaporating in the initial stage of the vapor deposition in the evaporation sources 8a and 8b and from adhering on the vapor deposition substrate 4. The shutter may be opened for example in the state wherein the temperature of the evaporation source is not more than 200° C., or opened after confirming that the vapor amount generated from the evaporation source is stable. Alternatively, the shutters may be closed after confirming that all of the phosphor materials in the evaporation sources 8a and 8b are depleted, or closed in the state wherein the phosphor materials are remaining in the evaporation sources.

A process for producing the radiation image conversion panel of the present invention using the above-described production apparatus will now be described. First, a vapor deposition substrate 4 is attached to a support holder 5. Near the bottom of a vacuum vessel 2, evaporation sources 8a and 8b are arranged on a circumference of a circle having the center axis perpendicular to the vapor deposition substrate 4. Next, crucibles, boats or the like are filled with two or more phosphor matrix compounds (CsI: without activator) and an activator (TlI), and set on the evaporation sources.

Preheating may be carried out to remove impurities in the filled phosphor matrix compounds and activator before vapor deposition. The preheating is preferably carried out at a temperature not more than the melting point of the material to be used. For example, in case of cesium iodide, the preheating temperature is preferably from 50 to 620° C., more preferably from 100 to 500° C. In case of thallium iodide, the preheating temperature is preferably from 50 to 440° C., more preferably from 100 to 400° C.

Once the inside of the vapor deposition apparatus is evacuated, argon gas is introduced to adjust the degree of vacuum, then the vapor deposition substrate is rotated. The number of rotation is, depending on the size of the vapor deposition apparatus, usually from 2 to 15, preferably from 4 to 10. Next, the crucible filled with the phosphor matrix compounds (CsI: without activator) is heated to deposit phosphors, thereby forming a base layer (the first phosphor layer). Considering the improvement of the emission luminance and the preservation, a small amount of activators may be added to the base layer. The temperature of the substrate is usually from 5 to 100° C., preferably from 15 to 50° C. The thickness of the base layer is, depending on the crystal diameter or the thickness of the phosphor layer, usually from 0.1 to 50 µm. Next, heating of the substrate (vapor deposition substrate) is started to heat the substrate temperature to 150-250° C., thereby starting the vapor deposition of the remaining phosphor matrix compound (CsI: without activator) and activator (TlI) in the crucible. Here, the phosphor matrix compounds are preferably deposited at a vapor deposition rate faster than that for the base layer taking the productivity into consideration. Depending on the thicknesses of the base layer and the phosphor layer, the vapor deposition is carried out preferably at 5 to 100 times the rate of the vapor deposition for the base layer, more preferably at 10 to 50 times. In the method of evaporating the activator, the activator alone may be evaporated, or alternatively, an evaporation source obtained by mixing cesium iodide and thallium iodide may be prepared and heated to the temperature at which cesium iodide is not deposited while only thallium iodide is deposited (e.g., 450-600° C.) for vapor deposition.

In the vapor deposition method, a reactive vapor deposition in which gas such as oxygen or hydrogen is introduced as required and deposited may be carried out.

It is necessary to cool the support which has been heated in vapor deposition because of high temperatures. The average cooling rate in a step of cooling the phosphor layer to 80° C. can be within the range from 0.5 to 10° C./min to carry out cooling without damaging the substrate. It is especially useful in case where, for example, a relatively thin substrate such as polymer film having 10-500 µm of thickness is used as the support. It is especially preferred that this cooling step is carried out under the atmosphere with a degree of vacuum of $1 \times 10^{-5}$ Pa to 0.1 Pa. In the cooling step, a means of introducing inert gas such as argon or helium into the vacuum vessel of the vapor deposition apparatus may also be employed. The average cooling rate herein is obtained by continuously measuring times and temperatures during cooling to 80° C. after the start of cooling (at the end of vapor deposition) and then calculating the cooling rate per 1 minute during the period. After completing the vapor deposition and before carrying out cooling, the phosphor layer may be heat treated.

EXAMPLES

The present invention will now be described concretely, but the embodiment of the present invention is not restricted thereto.

Preparation of Radiation Image Conversion Panel

Example 1

On a polyimide film (produced by Ube Industries. LTD.; trademark: UPILEX; film thicknesses: 125 µm) as a support, silver as a reflection layer was formed by sputtering method. As an under coating layer, 10 parts by weight of curing agent (HMDI) was blended to 100 parts by weight of polyester (produced by Toyobo Co.; trademark: Vylon 300; glass transition temperature (Tg): 7° C.) and titanium oxide was blended thereto, then 50 parts by weight of toluene and 50 parts by weight of methyl ethyl ketone with respect to 100 parts by weight of solid content were added as a solvent and the mixture was kneaded to obtain a coating solution, which was applied to the polyimide surface by spin coat and dried.

In this case, the average coating thickness of the under coating layer was 50 µm, and the elastic modulus in a initial substrate temperature measured by nanoindentation method for the under coating layer was 1.1 GPa.

Cesium iodide and an activator (thallium iodide) were deposited on the surface of the above-described under coating layer using a vapor deposition apparatus as shown in FIG. 1, and then a phosphor layer was formed as follows.

First, two resistance heating crucibles were filled with cesium iodide (CsI) and one resistance heating crucible was filled with thallium iodide (TlI). A vapor deposition substrate was fitted to a metallic frame of a rotating support holder, and the distance between the vapor deposition substrate and evaporation sources was controlled to 400 mm.

After evacuating the interior of the vapor deposition apparatus, argon gas was introduced thereto to control the degree of vacuum to 0.5 Pa and the vapor deposition substrate was rotated at a rate of 6 rpm. At this time, the temperature of the vapor deposition substrate (initial substrate temperature) was set to 20° C. Subsequently, one of the resistance heating crucibles filled with cesium iodide was heated to deposit a phosphor material. A base layer (first phosphor layer) was thus formed.

Next, heating of the vapor deposition substrate was started, and after the temperature of the vapor deposition substrate reached 200° C., the substrate was maintained at the temperature. Another resistance heating crucible filled with cesium iodide and the resistance heating crucible filled with thallium iodide were then heated to start vapor deposition, respectively. At this time, the vapor deposition rate of cesium iodide was controlled to be 10 times as faster as the rate when the base layer was formed. The vapor deposition rate of an activator was controlled such that the vapor deposition rate when a phosphor layer (second phosphor layer) was formed is ½ as faster as the vapor deposition rate when the first phosphor layer was formed. On the thicknesses of the phosphor layer reached 400 µm, vapor deposition was terminated to obtain a radiation image conversion panel in which a phosphor (CsI: 0.003Tl, i.e., containing 0.3 mol % of Tl) layer was formed on a vapor deposition substrate.

Example 2

In Example 1, as an under coating layer, 10 parts by weight of curing agent (HMDI) was blended to 100 parts by weight of polyester (produced by Toyobo Co.; trademark: Vylon 780; Tg: 35° C.) and titanium oxide was blended thereto, then 50 parts by weight of toluene and 50 parts by weight of methyl ethyl ketone with respect to 100 parts by weight of solid content were added as a solvent and the mixture was kneaded to obtain a coating solution, which was applied to the polyimide surface by spin coat and dried.

In this case, the average coating thickness of the under coating layer was 50 µm, and the elastic modulus in a initial substrate temperature measured by nanoindentation method for the under coating layer was 10 GPa.

A radiation image conversion panel was produced by the same method as in Example 1 except for the above-described and that the initial substrate temperatures was set to 20° C.

Example 3

In Example 1, as an under coating layer, 10 parts by weight of curing agent (HMDI) was blended to 100 parts by weight of polyester (produced by Toyobo Co.; trademark: Vylon 630), then 50 parts by weight of toluene and 50 parts by weight of methyl ethyl ketone with respect to 100 parts by weight of solid content were added as a solvent and the mixture was kneaded to obtain a coating solution, which was applied to the polyimide by spin coat and dried.

In this case, the average coating thickness of the under coating layer was 1 µm, and the elastic modulus in a initial substrate temperature measured by nanoindentation method for the under coating layer was 6 GPa.

A radiation image conversion panel was produced by the same method as in Example 1 except for the above-described and that the initial substrate temperatures was set to 50° C.

Example 4

In Example 1, as an under coating layer, 5 parts by weight of curing agent (HMDI) was blended to 100 parts by weight of polyester (produced by Toyobo Co.; trademark: Vylon 630), then 50 parts by weight of toluene and 50 parts by weight of methyl ethyl ketone with respect to 100 parts by weight of solid content were added as a solvent and the mixture was kneaded to obtain a coating solution, which was applied to the polyimide by spin coat and dried.

In this case, the average coating thickness of the under coating layer was 1 µm, and the elastic modulus in a initial substrate temperature measured by nanoindentation method for the under coating layer was 1.5 GPa.

A radiation image conversion panel was produced by the same method as in Example 1 except for the above-described and that the initial substrate temperatures was set to 100° C.

Comparative Example 1

Twenty-five parts by weight of curing agent (HMDI) was blended to 100 parts by weight of polyester (produced by Toyobo Co.; trademark: Vylon 630), then 50 parts by weight of toluene and 50 parts by weight of methyl ethyl ketone with respect to 100 parts by weight of solid content were added as a solvent and the mixture was kneaded to obtain a coating solution, which was applied to the polyimide by spin coat and dried.

In this case, the average coating thickness of the under coating layer was 1 µm, and the elastic modulus in a initial substrate temperature measured by nanoindentation method for the under coating layer was 20 GPa.

A radiation image conversion panel was produced by the same method as in Example 1 except for the above-described and that the initial substrate temperatures was set to 0° C. and the degree of vacuum was controlled to 1.0 Pa.

Comparative Example 2

A radiation image conversion panel was produced by the same method as in Example 1 except that, in Example 1, an amorphous carbon was used as a support, that polyparaxylylene was used as an under coating layer, that an under coating layer was formed whose elastic modulus in the initial substrate temperature is not more than 1 GPa, and that the substrate temperature was heated to 250° C. and maintained at the constant temperature.

Comparative Example 3

A phosphor layer was formed by depositing a phosphor material by the same method as in Example 1 except that, in Example 1, an alkali-free glass was used as a support, and that a vapor deposition substrate without an under coating layer was used.

After evacuating the interior of the vapor deposition apparatus, argon gas was introduced thereto to control the degree of vacuum to 0.75 Pa and the vapor deposition substrate was rotated at a rate of 6 rpm. At this time, the temperature of the vapor deposition substrate was set to 200° C. as shown in Table 1. Subsequently, one of the resistance heating crucibles filled with cesium iodide was heated to deposit a phosphor.

Next, the degree of vacuum was controlled to 1.0 Pa, and from another resistance heating crucible filled with cesium iodide (CsI) and the resistance heating crucible filled with activator (thallium iodide (TlI)), phosphor materials were evaporated respectively to produce a radiation image conversion panel by the same method as in Example 1 to 4.

Measurement of Nanoindentation

As apparatus, Hysitron TriboScope placed in an environment control chamber was used. A sample was fixed on the stage, and the sample temperature was set to the initial substrate temperature described in Table 1. Indentation measurement was carried out 3 times each using a Berkovich indenter (triangular pyramidal diamond). As for the condition, loading was carried out to the maximum indentation depth of 300 nm at the indentation rate of 300 nm/sec and unloading was carried out at the same rate. The obtained load-displacement curve was analyzed to calculate hardness and complex elastic modulus.

Results of nanoindentation measurement for an under coating layer in a vapor deposition substrate, i.e., an under coating layer before a phosphor layer is formed are shown in Table 1.

Crystal Evaluation by EBSP Method

Figure 4:
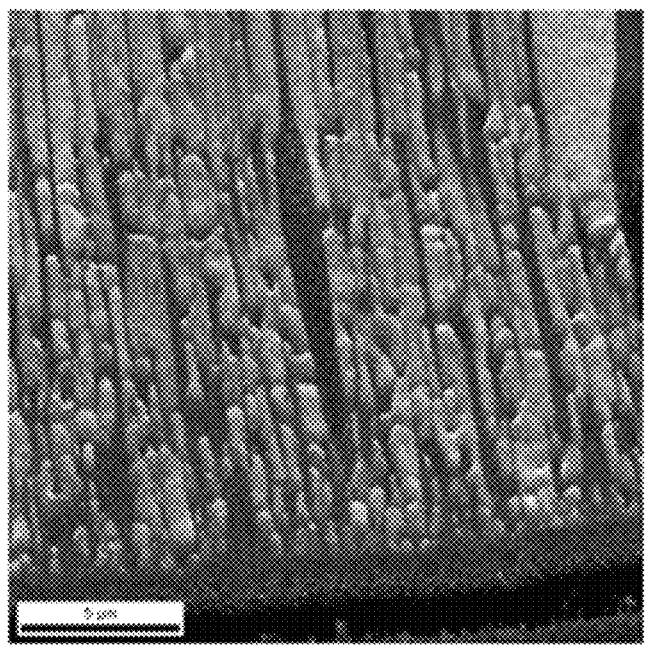
FIG. 4 is a EBSP measurement (Image Quality map) of a cross-section parallel to the crystal growth direction of phosphor layer.

For Example 1 to 4 and Comparative Example 1 to 3, voids in a phosphor layer formed on a vapor deposition substrate was filled and embedded with two-liquid mixing type thermoset resin (produced by Gatan; trademark: G2), and cross-sections parallel to the crystal growth direction were prepared by using Cross Section Polisher (SM-09010) produced by JEOL LTD. Immediately after polishing, the samples were introduced into SEM (SUPRA40VP produced by ZEISS LTD.), EBSP measurement was carried out for 5 visual fields of 20 µm×20 µm areas in steps of 0.1 µm using EBSP detector (Hikari High Speed EBSP Detector produced by EDAX(TSL) LTD.) at an accelerating voltage of 20 kV. Clean-up treatment was carried out by Grain Dilation method using EBSP analysis software (OIM Analysis produced by TSL Solutions LTD.) to obtain a Image Quality Map. A clear pattern was observed from the root portion of the start of crystallization in Example 1 to 4 (see FIG. 4).

Figure 5:
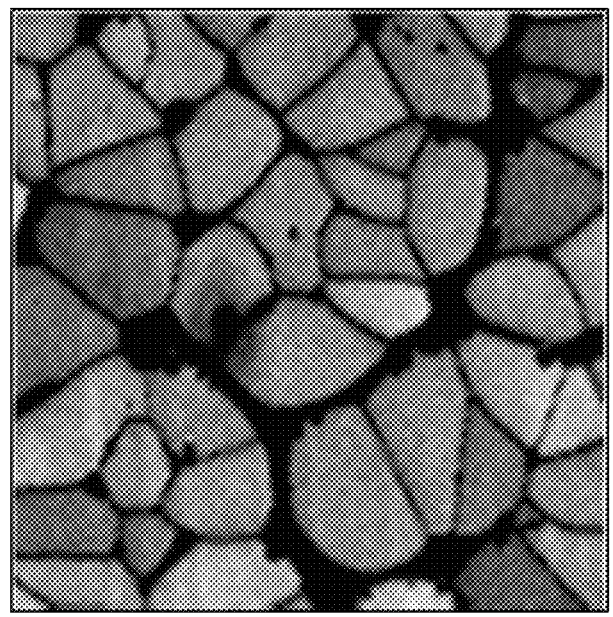
FIG. 5 is a EBSP measurement (Image Quality map) of a cross-section perpendicular to the direction of crystal growth of phosphor layer.
Figure 6:
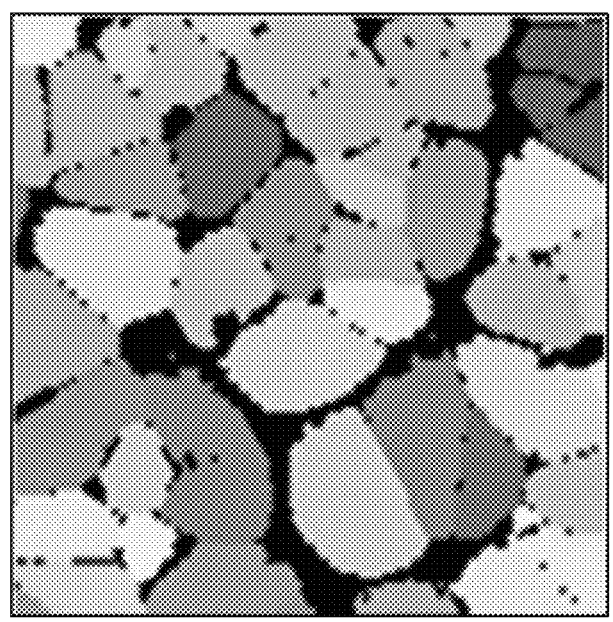
FIG. 6 is a EBSP measurement (Inverse Pole Figure map: ND) of a cross-section perpendicular to the direction of crystal growth of phosphor layer.
Figure 7:
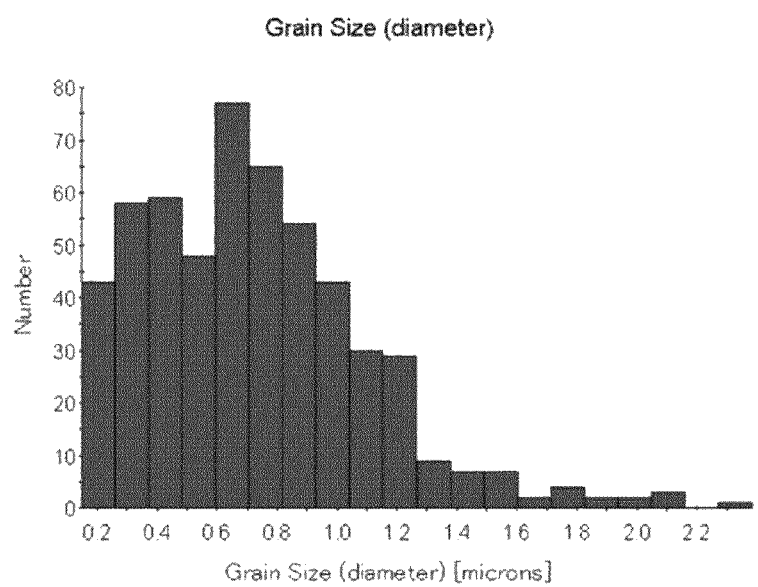
FIG. 7 is a graph showing a domain diameter distribution based on a EBSP measurement of a cross-section perpendicular to the direction of crystal growth of phosphor layer.

In the same manner, cross-sections perpendicular to the direction of crystal growth were prepared and EBSP patterns of visual fields were obtained. Clean-up treatment was carried out by Grain Dilation method using analysis software (OIM Analysis) to obtain a Image Quality Map (see FIG. 5). Considering crystals having orientation difference of 5 degree as one domain, crystal orientation difference analysis was carried out to calculate average diameter and coefficient of variation of the domain (e.g., see FIGS. 6 and 7 (Grain in FIG. 7 represents domain)). The average domain diameter of the root portion at which crystal growth started (initial average domain diameter), the coefficient of variation at the root portion at which crystal growth started, the average domain diameter at the position from the root portion at which crystal growth started to 50 µm (average domain diameter at the position of 50 µm), the coefficient of variation at the position from the root portion at which crystal growth started to 50 µm, and the average domain diameter at the position from the root portion at which crystal growth started to 375 µm (surface average domain diameter) are shown in Table 1.

Figure 8:
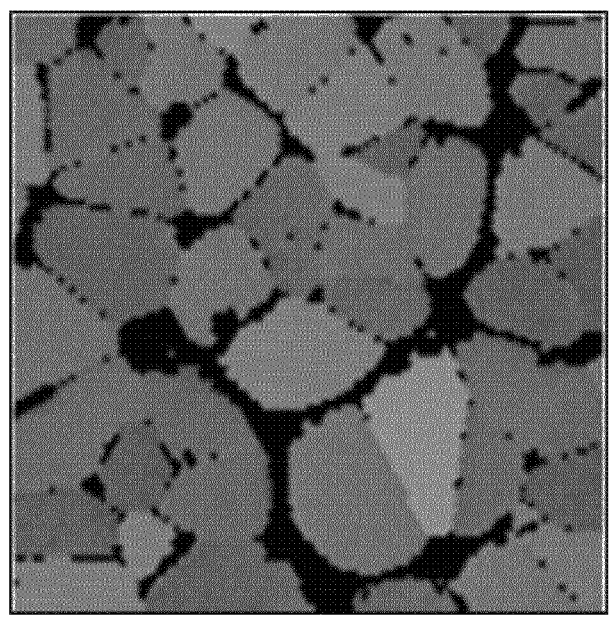
FIG. 8 is a EBSP measurement (Inverse Pole Figure map: ND) of a cross-section perpendicular to the direction of crystal growth of phosphor layer.

EBSP patterns obtained from samples of cross-sections perpendicular to the direction of crystal growth were used to prepare a crystal orientation map (Inverse Pole Figure map) in (200) normal direction (ND direction). In the radiation image conversion panel prepared in Examples 1 to 4, in the thicknesses range from the root portion to 50 µm and in not less than 60% of the total projected area of a phosphor, (200) crystal orientation in crystal orientation analysis using EBSP patterns was not more than 10 degree (see FIG. 8).

Evaluation of Film Adhesion

Peeling of phosphor (film peeling) when an adhesive tape was attached to a phosphor surface and then peeled off was evaluated.

AA: no film peeling occurred

BB: slight film peeling occurred

CC: a lot of film peeling occurred

Evaluation of Immediate Characteristics

X-RAY of 80 kVp tube voltage was irradiated to a flat panel display (FPD), and the average signal value of the resulting image data was considered as amount of luminescence. Luminance described in Table 1 is relative estimation based on amount of luminescence of Example 1 as 100.

X-RAY of 80 kVp tube voltage was irradiated through a lead MTF chart to the radiation entrance surface side of a FPD, and image data was detected and recorded on a hard disk. Then, the record on the hard disk was analyzed, and MTF of the X-ray image recorded on the hard disk (MTF value at spatial frequency 1 cycle/mm) was considered as index of sharpness. The higher value of MTF means being the more superior in sharpness. Sharpness described in Table 1 is relative estimation based on MTF of Example 1 as 100.

Comprehensive Evaluation

In the evaluation of film adhesion and immediate characteristics, based on Example 1 (BB: good), CC: bad was assigned if there was deteriorated performance, and AA: very good was assigned if there was no deteriorated performance and there was improved performance.

TABLE 1

| Test piece | Support | Reflection layer | under coating layer | Elastic modulus at the initial substrate temperature (GPa) | Initial substrate temperature (° C.) | Film thickness (µm) | EBSD pattern | Initial average domain diameter (µm) | Coefficient of variation (%) | Average domain diameter at the position 50 µm (µm) |
|---|---|---|---|---|---|---|---|---|---|---|
| Comparative Example 1 | Polyimide | Al | Polyester + curing agent (1 µm) *1) | 20 | 0 | 400 | unclear | 0.1 | 45 | 1.0 |
| Example 1 | Polyimide | Al | TiO$_2$/polyester (Tg: 7° C.) | 1.1 | 20 | 400 | clear | 0.2 | 33 | 1.8 |
| Example 2 | Polyimide | Al | TiO$_2$/polyester (Tg: 35° C.) | 10 | 20 | 400 | clear | 0.3 | 35 | 2.0 |
| Example 3 | Polyimide | Al | Polyester + curing agent (1 µm) *1) | 6 | 50 | 400 | clear | 0.7 | 30 | 2.6 |
| Example 4 | Polyimide | Al | Polyester + curing agent (1 µm) *1) | 1.5 | 100 | 400 | clear | 1.0 | 50 | 2.9 |
| Comparative Example 2 | Amorphous carbon | Al | Polyparaxylylene | not more than 1 | 250 | 400 | clear | 1.5 | 70 | 3.1 |
| Comparative Example 3 | Alkali-free glass | Al | no under coating layer | 65 | 200 | 400 | partly unclear | 1.8 | 65 | 3.4 |

| Test piece | Coefficient of variation (%) | Surface average domain diameter (µm) | Film adhesion | Immediate characteristics Luminance | Immediate characteristics Sharpness | Comprehensive evaluation |
|---|---|---|---|---|---|---|
| Comparative Example 1 | 42 | 3.0 | CC | 85 | 92 | CC |
| Example 1 | 30 | 3.0 | AA | 100 | 100 | BB |
| Example 2 | 32 | 5.0 | AA | 120 | 110 | AA |
| Example 3 | 28 | 7.0 | AA | 121 | 105 | AA |
| Example 4 | 45 | 10.0 | AA | 123 | 109 | AA |
| Comparative Example 2 | 60 | 12.0 | BB | 99 | 75 | CC |
| Comparative Example 3 | 55 | 10.0 | CC | 88 | 73 | CC |

TABLE 1-continued

*[1]) A curing agent is added to a polyester such that the elastic modulus at the initial substrate temperature is adjusted to be the values in Table 1.

EXPLANATION OF NUMERALS

1: vapor deposition apparatus
2: vacuum vessel
3: evacuation pump
4: vapor deposition substrate
5: support holder
6: support rolling mechanism
7: support rotation axis
8a, 8b: evaporation source
9: shutter
1A: circuit substrate
2A: sensor panel
3A: protection film
4A: phosphor layer
5A: under coating layer
6A: light reflection layer
7A: support
1B: vapor deposition substrate
2B: phosphor columnar crystal

What is claimed is:

1. A radiation image conversion panel comprising:
a support; and
a phosphor layer mainly composed of an alkali halide, the phosphor layer being formed by vapor deposition,
wherein the phosphor layer comprises a plurality of domains formed of a plurality of phosphor columnar crystals,
each of the domains is single phosphor columnar crystal or an aggregation of phosphor columnar crystals having substantially the same crystal orientation,
the phosphor columnar crystals are crystalline from root portion at which crystal growth started, and an average diameter of the domain within the range of thickness from the root portion at which the crystal growth of the phosphor columnar crystals started to 50 µm in the phosphor layer is 0.2 to 10 µm with a coefficient of variation of 50% or less.

2. The radiation image conversion panel according to claim 1, wherein the average diameter of the domain within the range of thickness from the root portion at which crystal growth of the phosphor columnar crystal started to 50 µm in the phosphor layer is 0.3 to 3 µm with the coefficient of variation of 50% or less.

3. The radiation image conversion panel according to claim 1, wherein the (200) crystal orientation determined by crystal orientation analysis using EBSP (Electron Back Scattering Pattern) is not more than 10 degree in not less than 60% of total phosphor projected area in a cross-section perpendicular to the direction of crystal growth within the range of thickness from the root portion at which crystal growth of the phosphor columnar crystal started to 50 µm in the phosphor layer.

4. The radiation image conversion panel according to claim 1, wherein the alkali halide is an alkali halide of cubic system.

5. The radiation image conversion panel according to claim 4, wherein the alkali halide of cubic system is cesium iodide.

6. The radiation image conversion panel according to claim 1, wherein the phosphor columnar crystals further comprise a thallium compound which is an activator.

7. The radiation image conversion panel according to claim 1, further comprising an under coating layer between the support and the phosphor layer.

* * * * *